United States Patent [19]

Braun

[11] Patent Number: 5,332,074
[45] Date of Patent: Jul. 26, 1994

[54] INCIPIENT CLUTCH CONTROL SYSTEM

[75] Inventor: Eugene R. Braun, Royal Oak, Mich.

[73] Assignee: Eaton Corporation, Cleveland, Ohio

[21] Appl. No.: 817,161

[22] Filed: Jan. 6, 1992

[51] Int. Cl.$^5$ ............................................. B60K 41/22
[52] U.S. Cl. ................... 192/3.63; 192/3.58; 477/87
[58] Field of Search ............... 192/3.63, 3.58, 0.092, 192/0.052, 0.032

[56] References Cited

U.S. PATENT DOCUMENTS

| | | | |
|---|---|---|---|
| 4,629,045 | 12/1986 | Kasai et al. | 192/0.052 |
| 4,653,621 | 3/1987 | Oshiage | 192/0.052 X |
| 4,662,491 | 5/1987 | Takefuta et al. | 192/0.032 |
| 4,678,069 | 7/1987 | Yoshimura et al. | 192/0.033 |
| 4,765,450 | 8/1988 | Kurihara et al. | 192/0.092 X |
| 4,825,993 | 5/1989 | Kurihara et al. | 192/0.092 |
| 4,854,433 | 8/1989 | Tellert | 192/3.58 X |
| 4,899,858 | 2/1990 | Coté et al. | 192/0.092 X |
| 4,971,183 | 11/1990 | Tellert | 192/3.63 X |
| 5,029,678 | 7/1991 | Koshizawa | 192/0.076 |
| 5,065,849 | 11/1991 | Kono et al. | 192/0.052 X |
| 5,069,319 | 12/1991 | Makabe | 192/3.58 X |
| 5,176,234 | 1/1993 | Reik et al. | 192/0.032 X |

FOREIGN PATENT DOCUMENTS

| | | | |
|---|---|---|---|
| 2080910 | 2/1982 | United Kingdom | 192/3.58 |
| 2231116 | 7/1990 | United Kingdom | |

Primary Examiner—Leslie A. Braun
Assistant Examiner—Andrea Pitts
Attorney, Agent, or Firm—Albert E. Chrow

[57] ABSTRACT

An automatic clutch control system (200) is provided featuring programs for establishing optimum clutch engagement starting position (CPO) under varying operating conditions. The programs include the steps of both slow and rapid clutch engagement and preferably the storage of the (CPO) determined as a fault signal whenever its fractional relationship to the previously stored optimum clutch engagement starting position (CPN) exceeds a predetermined fraction (C6) that is less than one.

14 Claims, 7 Drawing Sheets

INCIPIENT CLUTCH CONTROL SYSTEM

INTRODUCTION

This invention relates generally to an automatic clutch control system for use between a vehicle engine and a transmission and more particularly to a control system that automatically positions the clutch for its most effective or incipient torque engagement starting position according to operating parameters such as engine speed, oil temperature and clutch wear.

BACKGROUND OF THE INVENTION

Interest in improving vehicle performance has increased dramatically in recent years with one result being the development of a variety of automatic systems for maintaining and controlling various engine parameters.

Of particular interest in the recent past has been the desire to position the incipient or engagement starting position of the clutch so that it is optimized according to particular engine conditions such as engine speed, transmission oil temperature and clutch wear existing at the time. For example, it may be desired that the disengaged position be advanced a predetermined amount toward the engaged position to account for wear or in a direction away from the engaged position in the case of increasing transmission oil temperature or higher engine speeds.

One example of a method for controlling friction clutch operation is described in published British application GB 2231116A. Here, apparatus and method are disclosed for optimizing the engagement position of a friction clutch to achieve optimum driving comfort and to provide smooth driving operation resulting in lengthening the service life of the clutch as well as the life of the vehicle itself. More particularly the apparatus and method include means for detecting engine speed and transmission gear speed; means for measuring the clutch operating path; means for detecting the position of the fuel supply mechanism (i.e. throttle valve position); means for detecting the accelerator pedal position; means for detecting the idling position of the fuel supply mechanism; means for detecting the transmission position with neutral; means for detecting transmission gear change intent; a device for detecting the throttle valve end position; and an engine temperature measure. Signals provided by the above sensors are processed to provide an optimum position to which the friction clutch is moved between an open and closed condition by a piston driven mechanism so that the friction clutch's subsequent movement therefrom to a closed (engaged condition) is accomplished with optimal smoothness.

Another example of a clutch control system is described in U.S. Pat. No. 4,678,069, the disclosure of which is incorporated herein by reference. Here, transmission oil temperature and transmission input shaft speed are both used as correction factors for adjusting the clutch starting position.

Yet another example of an automatic clutch control system is disclosed in U.S. Pat. No. 5,029,678, the disclosure of which is incorporated herein by reference. Here, engine speed, transmission input shaft speed and amount of accelerator pedal depression are used to adjust the clutch's engagement starting position.

The system of the present invention utilizes sensed parameters of engine speed, transmission input shaft speed, actual and predetermined clutch position in conjunction with optional sensed or calculated parameters such as rate of change of transmission input shaft speed, transmission oil temperature, rate of change of clutch position in a control system for optimizing the clutch engagement start position under various operating conditions that uniquely utilizes two different rates of clutch engagement as part of a program for determining optimum clutch incipient starting position. The system of the invention further preferably establishes and stores fault codes in memory indicative of when the incipient clutch position for particular sensed operating conditions (when the transmission is not in neutral) differs by more than a predetermined fraction that is less than one.

SUMMARY OF THE INVENTION

Accordingly, it is an object of this invention to provide a system for determining optimum incipient or engagement starting position for a motor vehicle transmission clutch under various operating conditions.

It is another object of this invention to provide a system for controlling the incipient or engagement starting position of a motor vehicle clutch that utilizes two different rates of engagement of the clutch as part of the process for determining the optimized or incipient position for the clutch under various operating conditions.

It is still another object of this invention to provide a fault code in a system for controlling optimum clutch engagement starting positions for various operating conditions when the optimized starting position for when the transmission is not at neutral differs by more than a predetermined fraction less than one from that for the same set of operating conditions when the transmission is at neutral.

DESCRIPTION OF SOME PREFERRED EMBODIMENTS

Figure 1:
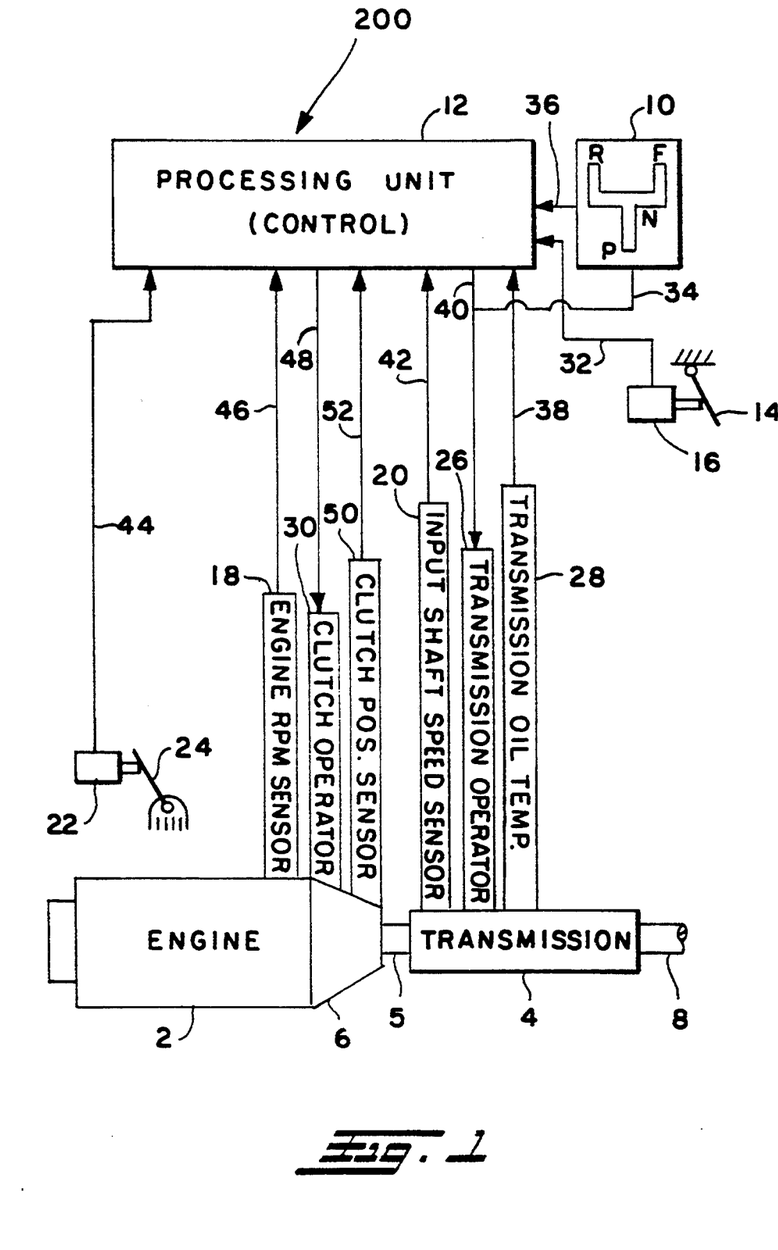
FIG. 1 is a block diagram of a clutch control system 200 of the invention.

In FIG. 1, engine 2 is selectively coupled to input shaft 5 of transmission 4 by coupling or clutch mechanism 6. Clutch mechanism 6 operates to provide the torque or gear ratios selected for enabling engine 2 to drive output shaft 8 when transmission 4 is coupled to engine 2. Shaft 8 may for example be connected to a vehicle's drive wheels by a differential mechanism or the like.

The present invention addresses the problem of establishing an optimum or incipient disengaged starting position from which to engage the clutch at various engine conditions that characteristically will vary according to parameters such as clutch wear, transmission oil temperature and engine speed at the time that the clutch is engaged.

System 200 in FIG. 1 is an automatic system for optionally positioning the incipient starting position of clutch 6 according to determination made from sensed conditions of engine speed, transmission shaft input speed, clutch position at neutral and, optionally, transmission oil temperature.

System 200 includes an information processing (control) unit 12 that includes suitable memory storage capabilities and receives and processes selected information according to a first program hereinafter described for FIGS. 2–4 and a second program hereinafter described with respect to FIGS. 5–7. Once determined, unit 12 provides an output command signal 48 that instructs clutch operator 30 to move the clutch to the incipient or optimum engagement starting position determined by the program.

Processing unit 12 receives a signal 46 from engine speed sensor 18 that is indicative of engine speed. Alternately, a throttle position sensor 22 may be employed that provides a signal 44 indicative of engine speed as a function of fuel consumption by monitoring position of accelerator pedal 24.

Processing unit 12 receives a signal 42 indicative of transmission input shaft speed being monitored by sensor 20 while receiving an input signal 38 indicative of transmission oil temperature monitored by sensor 28.

Processing unit 12 also receives a signal 52 indicative of clutch position monitored by sensor 50 or alternatively by signal 32 indicative of the position of clutch pedal 14 being monitored by sensor 16.

Processing unit 12 further receives a signal 36 indicative of the particular gear or torque condition selected for transmission 4 by gear or torque selector 10 i.e. whether it is in neutral position "N", reverse position "R", park position "P", or in a selected forward torque or gear position generally denoted by the letter "F". Selector 10 may itself provide a signal 34 for effecting the transmission gear desired through transmission operator 26 or by means of signal 40 from processing unit 12 as an alternate route when such is desired.

As previously described, examples of two programs by which processing unit 12 is able to effect positioning clutch 6 at the incipient engagement starting position are diagramed in FIGS. 2–4 and 5–7 respectively. The following symbols are used in FIGS. 2–7 to describe certain signals received by information processing unit 12.

$N_E$ = engine speed, rpm
C1, C2, = predetermined or calculated speeds, rpm
C3 = predetermined or calculated clutch position increment, inches
CPN = previous clutch incipient torque position, inches
CPO = clutch incipient torque position, inches
C4 = predetermined clutch position, inches
CPA = actual clutch position, inches
$N_T$ = transmission input speed, rpm
CP1 = a specific clutch position reading, inches
C5 = a calculated fraction
C6 = a predetermined fraction less than one
C7 = predetermined low speed, rpm Additionally, predetermined or calculated clutch position increment (C3) in inches may be determined by:
(a) using a predetermined value from memory.
(b) using a predetermined value of C3 plus a predetermined conversion factor multiplied times the temperature of the transmission oil.
(c) as a function of transmission input shaft speed.
(d) as a function of rate of change of transmission input shaft speed.
(e) as a function of rate of change of clutch position.
(f) as a percent of clutch incipient torque position (CPO).
(g) or if (CPO) is less than C4, by letting C3=C4.

Figure 2:
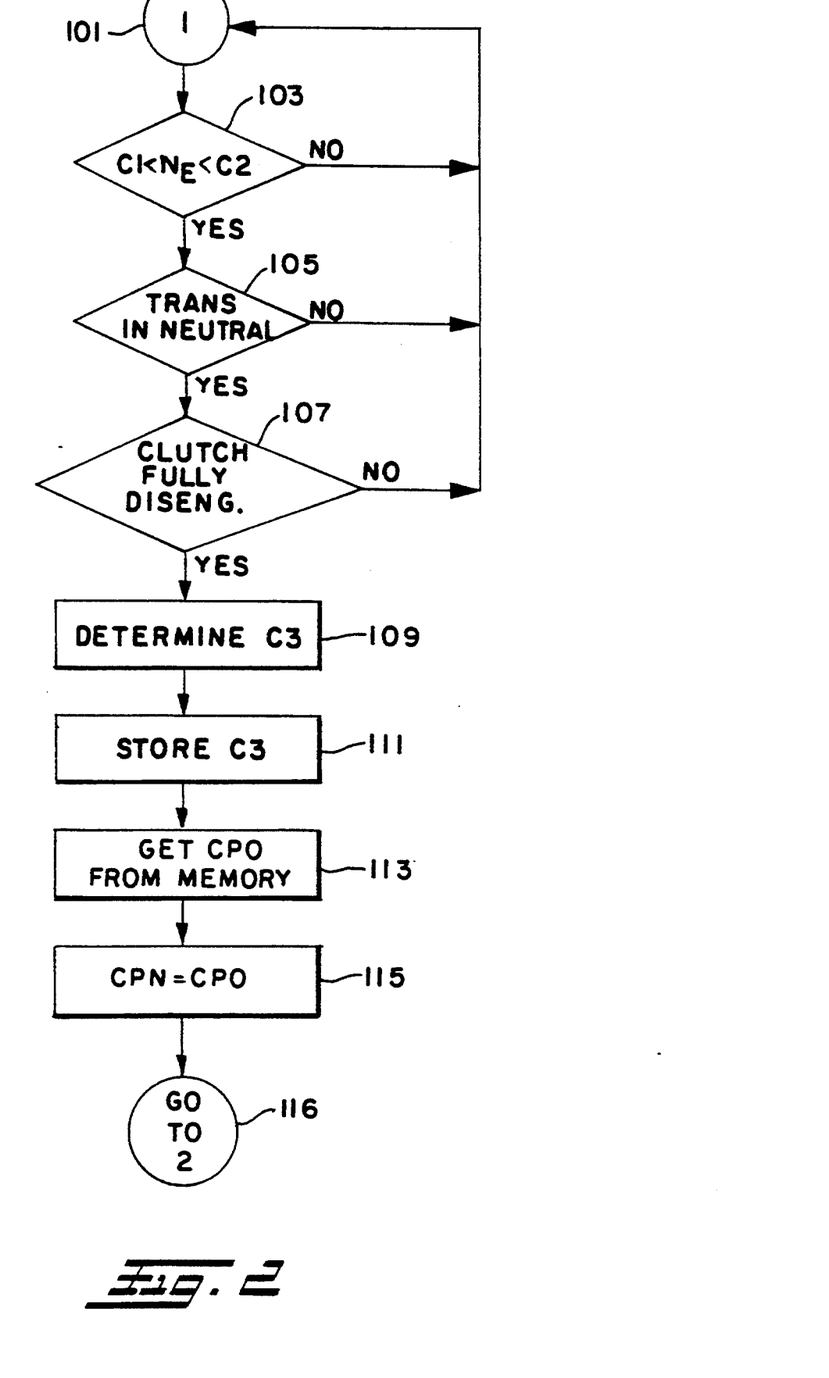
FIG. 2 is a block diagram of an initial portion of one program by which the optimal position at neutral is established.

The program portion of FIG. 2 stores in memory the value for (C3) in the step referenced by numeral 111 determined by any one of methods (a)–(f) above when the transmission is in neutral with clutch fully disengaged and engine speed ($N_E$) is between predetermined values (C1) and (C2). Clutch position (CPO) is then retrieved from memory in the step referenced by numeral 113 and equated to incipient clutch position at neutral (CPN) in the step referenced by numeral 115.

Figure 3:
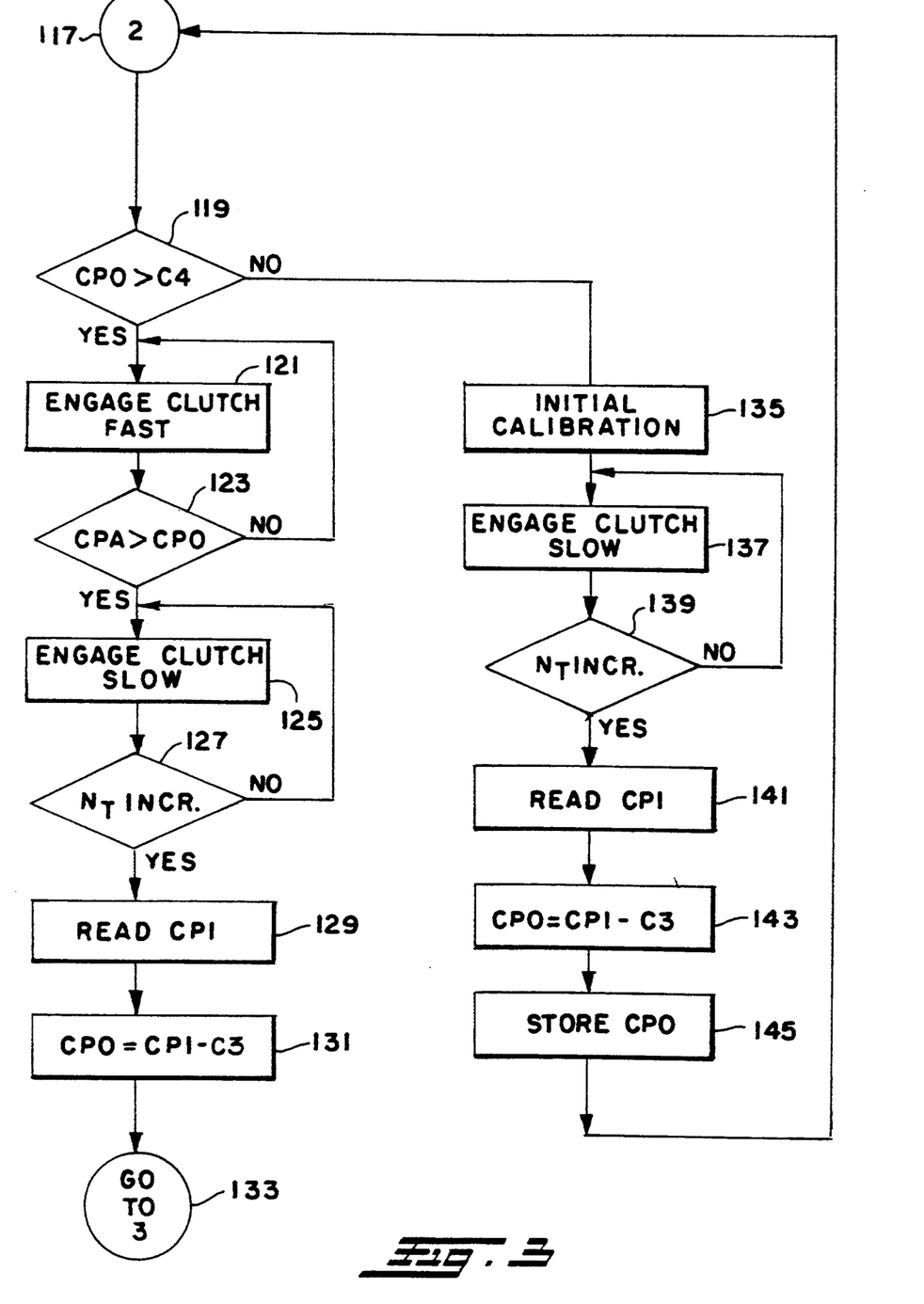
FIG. 3 is a block diagram of a continuation of the program of FIG. 1.

The program of FIG. 2 continues on FIG. 3 where (CPO) is then compared to a predetermined clutch position (C4) in the step referenced by numeral 119 and, if less, an initial calibration is entered into (reference numeral 135) in which the clutch is first engaged slowly (reference numeral 137) afterwhich the transmission input shaft speed ($N_T$) is monitored to see if it increased (reference numeral 139) and, if so, the clutch is again engaged slowly and the process repeated and, if yes, the specific clutch position (CP1) is recorded and (CPO) is corrected by processing unit 12 determining the function (CPO)=(CP1-C3) which is then stored and used in the program beginning at the step referenced by numeral 119 in FIG. 3.

If the initial (CPO) is greater than (C4) (reference numeral 119), unit 12 issues a command signal 48 instructing clutch operator 30 to engage the clutch rapidly in the step referenced by numeral 121 and, if the actual clutch position (CPA) is less than (CPO) in the step referenced by numeral 123, the process is repeated. If (CPO) is greater than (C4) in the step referenced by numeral 123, unit 12 issues a command signal 48 to clutch operator 30 instructing it to engage the clutch slowly (reference numeral 125) afterwhich the transmission input shaft speed is measured (reference numeral 127) and, if it has not increased, the process is repeated and, if the shaft speed has increased, the actual clutch position is read (reference numeral 129) and unit 12 determines (CPO) as a function of (CP1-C3).

Figure 4:
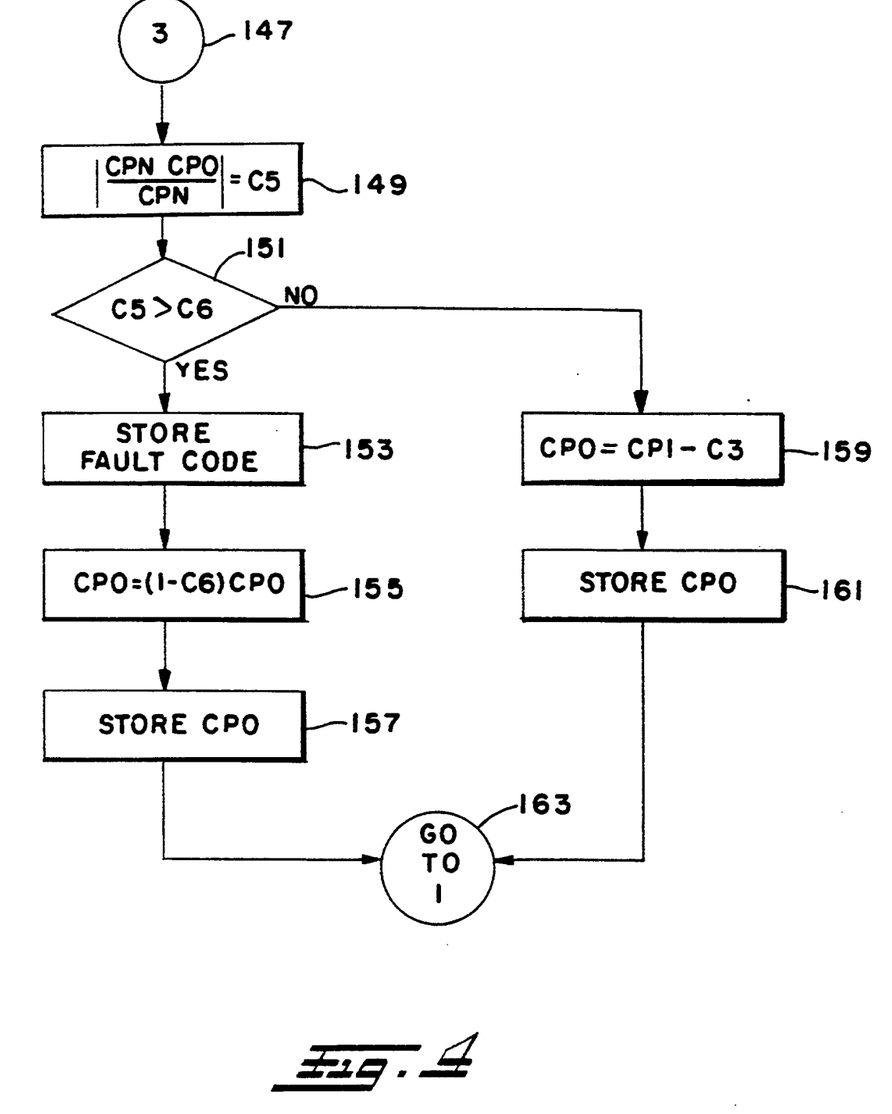
FIG. 4 is a block diagram of the final portion of the program of FIGS. 2 and 3.

The last portion of the first program hereinbefore described is set forth in FIG. 4 in which unit 12 determines the fraction (C5) from the equation $$(C5) = \left| \frac{CPN - CPO}{CPN} \right|$$

(reference numeral 149) which is then compared to (C6) (a predetermined fraction less than one) and, if (C5) is less than (C6), (CPO) is determined from the equation (CPO)=(CP1-C3) (reference numeral 159) which is then stored (reference numeral 161) and the process than returns to the step referenced by numeral 101 in FIG. 1.

If (C5) is greater than (C6) (reference numeral 151) in FIG. 4, it is stored as a fault code (reference numeral 153) afterwhich (CPO) is determined from the equation (CPO)=(1-C6) (CPO) (reference numeral 155) which is then stored (reference numeral 157) and the program returns to its initial starting point at reference numeral 101 in FIG. 1.

Figure 5:
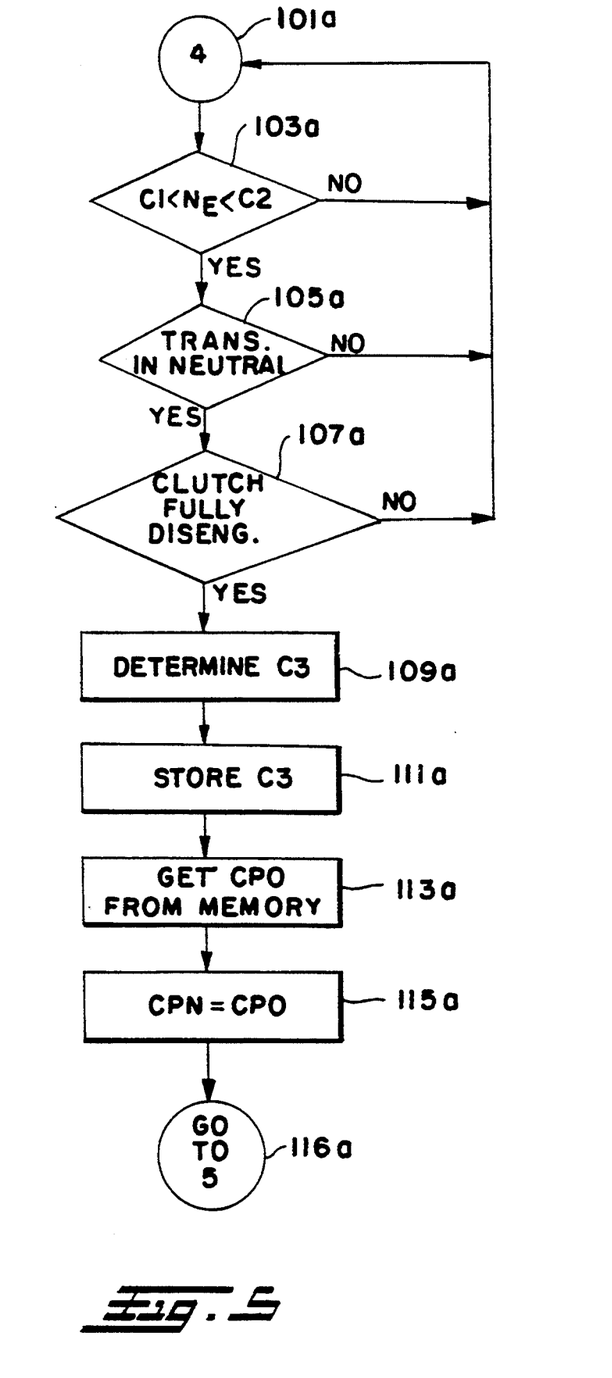
FIG. 5 is a block diagram of an initial portion of another program for determining the incipient clutch position which is the same as in FIG. 1.
Figure 6:
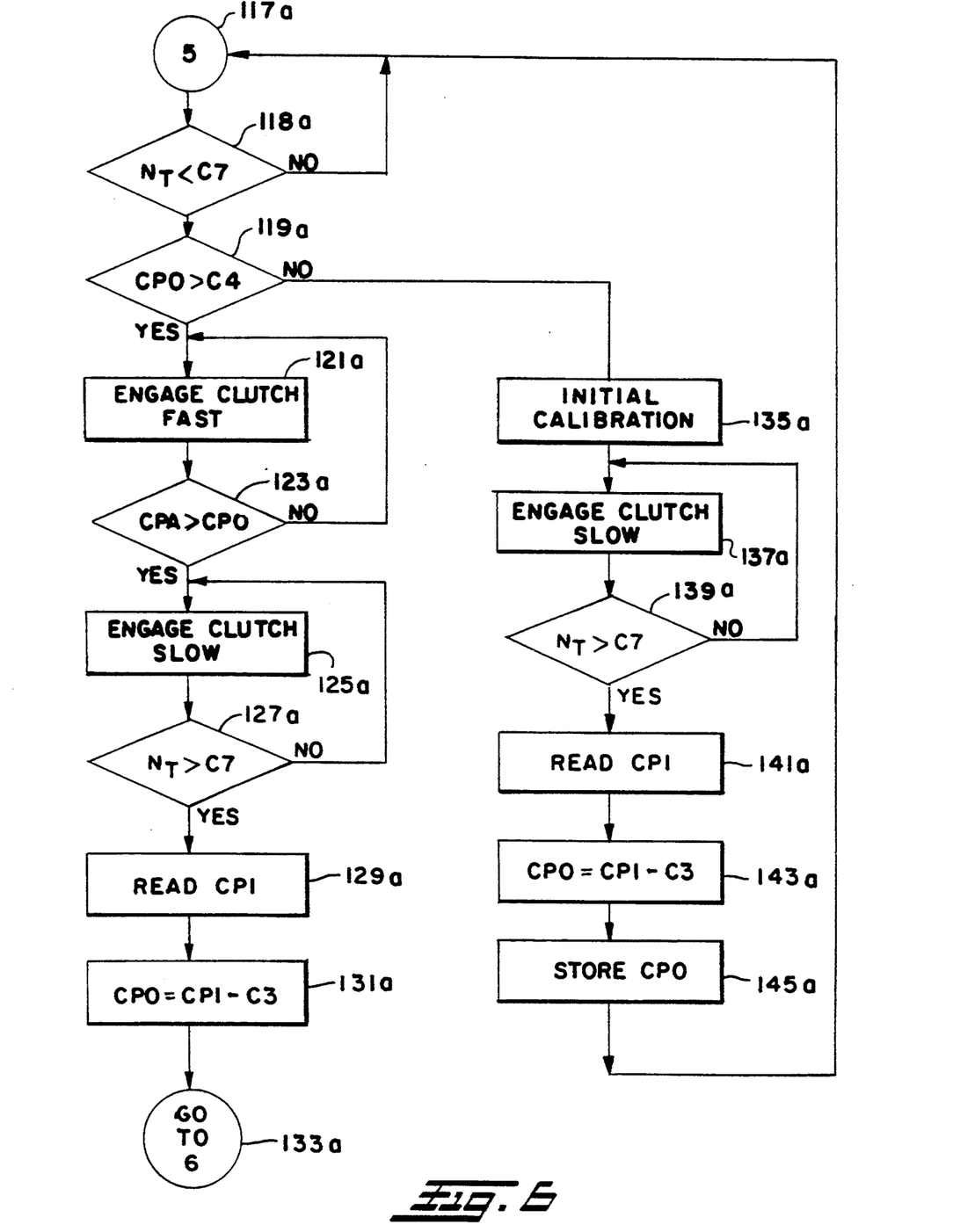
FIG. 6 is a block diagram of a program portion subsequent to the program of FIG. 5.
Figure 7:
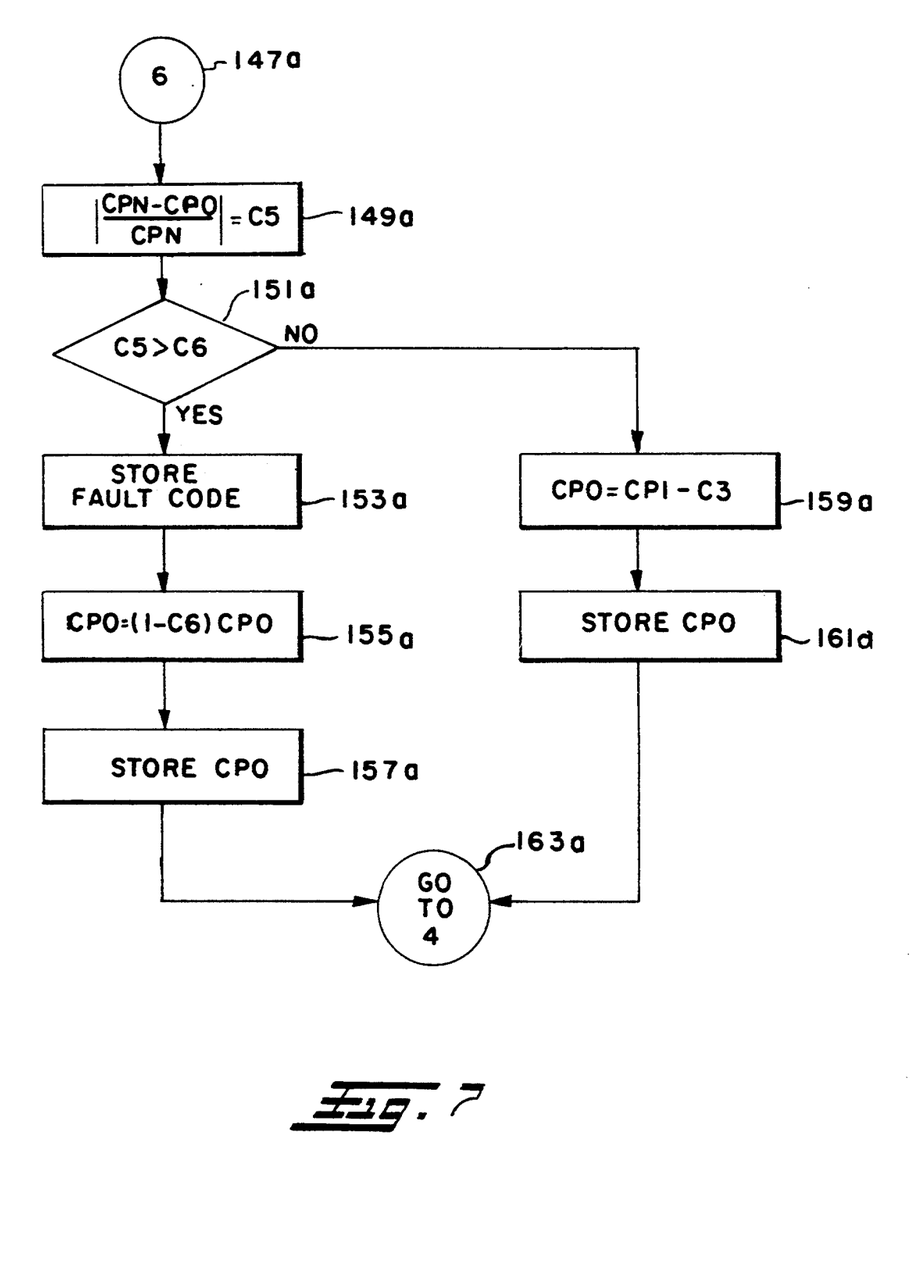
FIG. 7 is a block diagram of a final portion of the program of FIG. 6 and which is the same as the program portion in FIG. 4.

A second program of the invention for establishing the incipient (CPO) is set forth in FIGS. 5-7 with reference numerals carrying the subscript "a".

The steps referenced by the first portion of the second program referenced by numerals 101a through 116a in FIG. 5 for determining (CPO) from (CPN) at neutral are the same as the steps referenced by numerals 101 through 116 in FIG. 2 for the first program and are therefor not repeated here.

The second portion of the second program is shown in FIG. 6 in which it is determined if the transmission input shaft speed ($N_T$) (reference numeral 118a) is less than some predetermined low speed (C7) and, if not, the then the process is repeated and, if yes, it is determined whether the (CPO) determined by the step referenced by numeral 113a (FIG. 5) is greater than a predetermined clutch position (C4) (reference numeral 119a) and, if not, a calibrating procedure is entered into at reference numeral 135a in which unit 12 issues a command signal 48 to clutch operator 30 instructing it to engage the clutch slowly afterwhich unit 12 determines whether the transmission input shaft speed ($N_T$) is greater than a predetermined low speed (C7) (reference numeral 139a) and, if not, the process is repeated, and, if yes, its value is read as (CP1) (reference numeral 141a) and (CPO) is determined by unit 12 from the equation (CPO)=(CP1-C3) afterwhich it is stored (reference numeral 145a) and used as the value of (CPO) at the step referenced by numeral 119a.

If (CPO) is greater than C4 (reference numeral 119a), unit 12 issues a command signal 48 instructing clutch operator 30 to engage the clutch rapidly (reference numeral 121a) afterwhich unit 12 determines whether (CPA) is greater than (CPO) and, if not, the process is repeated, and, if so, unit 12 then issues a command signal 48 instructing the clutch to engage slowly (reference numeral 125a). It is then determined by unit 12 whether the transmission input shaft speed ($N_T$) is greater than a predetermined low speed (C7) and, if not, the process is repeated and, if yes, unit 12 then determines whether the transmission input shaft speed ($N_T$) is greater than the predetermined low speed (C7) and, if not the process is repeated.

If $N_T$ is greater than (C7) (reference numeral 127a), the actual clutch position (CP1) is read (reference numeral 129a) and unit 12 then determines (CPO) from the equation (CPO)=(CP1-C3) (reference numeral 131a) which is used as the starting position (reference numeral 147a) of the last portion of the second program shown in FIG. 7.

The program portion denoted by reference numerals 147a-161a in FIG. 7 is the same as the program portion denoted by reference numerals 147-161 in FIG. 4 previously described and is therefor not repeated here. The (CPO) finally determined at reference numerals 157a or 161a is used as input information to the initial step of the second program referenced by numeral 101a in FIG. 5.

It can readily be seen that programs in accordance with the present invention for establishing the optimum clutch engagement starting position (CPO) include the steps of both slow and rapid engagement of the clutch in the determination process as well as preferably storing the fractional relationship between the determined (CPO) and the optimum neutral clutch engagement starting position (CPO) whenever the fraction exceeds a predetermined fraction (C6) that is less than one.

I claim:

1. A method for optimizing a clutch engagement starting position of a clutch for coupling a vehicle engine to a transmission input shaft, said method including the step of providing an information processing unit having means for receiving a plurality of input signals including (1) a signal indicative of engine speed, (2) a signal indicative of actual clutch position, (3) a signal indicative of transmission input shaft speed and, (4) a signal indicative of whether or not the transmission is in a neutral position, said processing unit including means for processing said input signals according to a predetermined program for determining an optimum clutch engagement starting position and for issuing an output command signal instructing a clutch operator to move the clutch thereto and further operative to reduce the optimum clutch engagement starting position by a predetermined amount whenever the change from a previous clutch engagement starting position when expressed as a fraction of said position is greater than a predetermined fraction that is less than one.

2. A method for optimizing a clutch engagement starting position of a clutch for coupling a vehicle engine to a transmission input shaft, said method including the step of providing an information processing unit having means for receiving a plurality of input signal including (1) a signal indicative of engine speed ($N_E$); (2) a signal indicative of actual clutch position (CPA); (3) a signal indicative of transmission input shaft speed ($N_T$) and; (4) a signal indicative of whether or not the transmission is in a neutral condition, said processing unit including means for processing said input signals according to a predetermined program for determining an optimum clutch engagement starting position (CPO) and for issuing an output command signal instructing a clutch operator to move the clutch thereto, and said program including the steps of:

storing a selected one of a predetermined or calculated clutch position increment (C3) in memory;
retrieving from memory a previously stored value of the optimum clutch engagement starting position (CPO);
comparing the retrieved optimum clutch engagement position (CPO) to a predetermined clutch position (C4) and, if less,
(i) initiating a calibration procedure by which the processing unit issues a command signal causing the clutch to engage slowly and then determining whether the transmission input shaft speed ($N_T$) is increasing and, if not, repeating the slow clutch engagement and, if yes, determining a specific clutch position (CPI) and then determining the optimum clutch engagement starting position (CPO) as a difference between the specific clutch position (CPI) and the selected one of the predetermined calculated clutch position increment (C3) and then storing the determined optimum clutch engagement starting position (CPO) and, again comparing said optimum clutch engagement starting position (CPO) to the predetermined clutch position (C4) and, if greater, (ii) issuing a command signal causing the clutch to engage rapidly and then determining whether the actual clutch position (CPA) is greater than the optimum clutch starting position (CPO) and, if not, repeating the rapid clutch engagement and, if yes, issuing a command signal causing the clutch to engage slowly and then determining whether the transmission input shaft speed ($N_T$) has increased and, if not, repeating the slow clutch engagement and, if yes, determining the specific clutch position (CPI) and then determining the optimum clutch engagement starting position (CPO) as the difference between the specific clutch position (CPI) and the selected one of predetermined or calculated clutch position increment (C3); determining a fractional relationship (C5) of the optimum clutch engagement starting position (CPO) to a previous optimum clutch engagement starting position (CPN); comparing said fractional relationship (C5) to a predetermined fraction less than 1 and;

(i) if less, calculating the optimum clutch engagement starting position (CPO) as a difference between specific clutch position (CPI) and the selected one of calculated and predetermined clutch position increment (C3) and storing said determined optimum clutch engagement starting position (CPO) value in memory; and (ii) if more, storing the fractional relationship (C5) in memory as a fault code and then determining the optimum clutch engagement starting position (CPO) by multiplying said optimum clutch engagement starting position (CPO) by the quantity one minus a predetermined fraction that is less than one and then storing said determined optimum clutch engagement starting position (CPO) value in memory.

3. A method for optimizing a clutch engagement starting position of a clutch for coupling a vehicle engine to a transmission input shaft, said method including the step of providing an information processing unit having means for receiving a plurality of input signals including (1) a signal indicative of engine speed ($N_E$); (2) a signal indicative of actual clutch position (CPA); (3) a signal indicative of transmission input shaft speed ($N_T$) and; (4) a signal indicative of whether or not the transmission is in a neutral condition, said processing unit including means for processing said input signals according to a predetermined program for determining an optimum clutch engagement starting position (CPO) and for issuing an output command signal instructing a clutch operator to move the clutch thereto, and said program including the steps of:

storing a selected one of a predetermined or calculated clutch position increment (C3) in memory;

retrieving from memory a previously stored value of an optimum clutch engagement starting position (CPN);

determining whether the transmission input shaft speed ($N_T$) is less than a predetermined low speed (C7) and, if not, repeating determination and, if yes, determining whether the optimum clutch engagement starting position (CPO) is greater than a predetermined clutch position (C4) and (i) if not, initiating a calibration procedure by which the processing unit issues a command signal causing the clutch to engage slowly and then determining whether the transmission input shaft speed ($N_T$) is greater than the predetermined low speed (C7) and, if not, repeating the slow clutch engagement and, if yes, determining a specific clutch position (CPI) and determining the optimum clutch engagement starting position (CPO) as a difference between the specific clutch position (CPI) and the selected one of calculated or predetermined clutch position increment (C3) and then storing the determined optimum clutch engagement starting position (CPO) in memory and again comparing said optimum clutch engagement starting position (CPO) to predetermined clutch position (C4) and, if further away from and engagement position (ii) issuing a command signal causing the clutch to engage rapidly and determining whether the actual clutch position (CPA) is greater than the optimum clutch engagement starting position (CPO) and, if yes, issuing a command signal causing the clutch to engage slowly and determining whether the transmission input shaft speed is greater than the predetermined low speed (C7) and, if not, repeating the slow clutch engagement and, if yes, determining the actual clutch position (CPI) and determining the optimum clutch engagement starting position (CPO) as a difference between the specific clutch position (CPI) and the selected one of calculated or predetermined clutch position increment (C3); and then determining a fractional relationship (C5) of the optimum clutch engagement starting position (CPO) to the previously clutch engagement starting position (CPN);

comparing the fractional relationship (C5) to a predetermined fraction (C6) less and 1 and;

(i) if less, calculating the optimum clutch engagement starting position (CPO) as a difference between specific clutch position (CPI) and the selected one of the calculated or predetermined clutch position increment (C3) and storing said determined optimum clutch engagement starting position (CPO) value in memory; and (ii) if more, storing the fractional relationship (C5) as a fault code and then determining the optimum clutch engagement starting position (CPO) by multiplying said optimum clutch engagement starting position (CPO) by the quantity one minus the predetermined fraction (C6) that is less than one and then storing said determined optimum clutch engagement starting position (CPO) value in memory.

4. The method of claim 2 or 3 wherein the selected one of the predetermined or calculated clutch position increment (C3) is a predetermined value.

5. The method of claim 2 or 3 wherein the selected one of the predetermined or calculated clutch position increment (C3) is a predetermined value plus a predetermined conversion factor multiplied by a temperature of the transmission oil.

6. The method of claim 2 or 3 wherein the selected one of the predetermined or calculated clutch position increment (C3) is a function of speed of the transmission input shaft.

7. The method of claim 2 or 3 wherein the selected one of the predetermined or calculated clutch position increment (C3) is a function of the rate of change of speed of the transmission input shaft.

8. The method of claim 2 or 3 wherein the selected one of predetermined or calculated clutch position increment (C3) is a function of rate of change of the clutch position.

9. The method of claim 2 or 3 wherein the selected one of predetermined or calculated clutch position increment (C3) is a percent of the optimum clutch engagement starting position (CPO).

10. The method of claim 2 or 3 wherein the selected one of predetermined or calculated clutch position increment (C3) is equal to the predetermined clutch position (C4) when the optimum clutch engagement position (CPO) is less than the predetermined clutch position (C4).

11. A method for optimizing a clutch engagement starting position of a clutch for coupling a vehicle engine to a transmission input shaft, said method including the step of providing an information processing unit having means for receiving a plurality of input signals including (1) a signal indicative of engine speed, (2) a signal indicative of actual clutch position, (3) a signal indicative of transmission input shaft speed and, (4) a signal indicative of whether or not the transmission is in a neutral position, said processing unit including means for processing said input signals according to a predetermined program for determining an optimum clutch engagement starting position and for issuing an output command signal instructing a clutch operator to move the clutch thereto, and said program including the step of engaging the clutch slowly in the event that the optimum clutch engagement starting position is less than a predetermined value until the transmission input shaft speed increases when the clutch position is measured and a predetermined clutch position increment (C3) plus a predetermined conversion factor multiplied by a temperature of the transmission oil is subtracted from the measured clutch position to determine a new optimum clutch engagement starting position.

12. A method for optimizing a clutch engagement starting position for coupling a vehicle engine to a transmission input shaft, said method including the step of providing an information processing unit having means for receiving a plurality of input signals including (1) a signal indicative of engine speed, (2) a signal indicative of actual clutch position, (3) a signal indicative of transmission input shaft speed, and (4) a signal indicative of whether or not the transmission is in a neutral position, said processing unit including means for processing said input signals according to a predetermined program for determining the optimum clutch engagement starting position and for issuing an output command signal instructing a clutch operator to move the clutch thereto, and said program including the step of engaging the clutch slowly in the event that the optimum clutch starting position is less than a predetermined value until the transmission input shaft speed increases above a predetermined value when the clutch position is increased and a predetermined position increment (C3) plus a predetermined conversion factor multiplied by a temperature of the transmission oil is subtracted from the actual clutch position to determined a new optimum clutch engagement starting position.

13. A method for optimizing a clutch engagement starting position of a clutch for coupling a vehicle engine to a transmission input shaft, said method including the step of providing an information processing unit having means for receiving a plurality of input signals including (1) a signal indicative of engine speed, (2) a signal indicative of actual clutch position, (3) a signal indicative of transmission input shaft speed and, (4) a signal indicative of whether or not the transmission is in a neutral position, said processing unit including means for processing said input signals according to a predetermined program for determining the optimum clutch engagement starting position and for issuing an output command signal, said program including the step of providing an output command signal instructing a clutch operator to move the clutch thereto, and said program including the step of engaging the clutch slowly in the event that the optimum clutch engagement starting position is less than a predetermined value until the transmission input shaft speed increases when the clutch position is measured and a predetermined position increment (C3) that is equal to a predetermined clutch position (C4) when the optimum clutch engagement starting position (CPO) is less than the predetermined value (C4) is subtracted from the measured clutch position to determine a new optimum clutch engagement starting position.

14. A method for optimizing a clutch engagement starting position of a clutch for coupling a vehicle engine to a transmission input shaft, said method including the step of providing an information processing unit having means for receiving a plurality of input signals including (1) a signal indicative of engine speed, (2) a signal indicative of actual clutch position, (3) a signal indicative of transmission input shaft speed and, (4) a signal indicative of whether or not the transmission is in a neutral position, said processing unit including means for processing said input signals according to a predetermined program for determining the optimum clutch engagement starting position and for issuing an output command signal, said program including the step of providing an output command signal instructing a clutch operator to move the clutch thereto, and said program including the step of engaging the clutch slowly in the event that the optimum clutch engagement value is less than a predetermined value until the transmission input shaft speed increases above a predetermined value when the clutch position is increased and a predetermined position increment (C3) that is equal to a predetermined clutch position (C4) when the optimum clutch engagement starting position (CPO) is less than the predetermined value (C4) is subtracted from the actual clutch position to determine a new optimum clutch engagement starting position.

* * * * *